(12) United States Patent
Hall et al.

(10) Patent No.: US 10,825,197 B2
(45) Date of Patent: Nov. 3, 2020

(54) THREE DIMENSIONAL POSITION ESTIMATION MECHANISM

(71) Applicant: Intel Corporation, Santa Clara, CA (US)

(72) Inventors: James Hall, Woodstock, CT (US); Rita Brugarolas Brufau, Hillsboro, OR (US); Fanny Nina Paravecino, San Jose, CA (US); Dante Salas, Lake Oswego, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/232,394

(22) Filed: Dec. 26, 2018

(65) Prior Publication Data

US 2019/0130602 A1     May 2, 2019

(51) Int. Cl.

| | |
|---|---|
| *G06T 7/73* | (2017.01) |
| *G06T 13/40* | (2011.01) |
| *G06K 9/62* | (2006.01) |
| *G06K 9/00* | (2006.01) |
| *G06T 17/00* | (2006.01) |

(52) U.S. Cl.
CPC ............ *G06T 7/74* (2017.01); *G06K 9/00362* (2013.01); *G06K 9/6202* (2013.01); *G06K 9/6228* (2013.01); *G06T 13/40* (2013.01); *G06T 17/00* (2013.01); *G06T 2207/10016* (2013.01); *G06T 2207/20084* (2013.01); *G06T 2207/30196* (2013.01); *G06T 2207/30221* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2012/0237111 A1* | 9/2012 | Sinha ..................... | G06K 9/469 382/154 |
| 2013/0142390 A1* | 6/2013 | Othmezouri ....... | G06K 9/00362 382/103 |
| 2019/0082211 A1* | 3/2019 | Vats ....................... | G06T 13/40 |
| 2019/0139297 A1* | 5/2019 | Chen ...................... | G06T 17/20 |
| 2019/0379819 A1* | 12/2019 | Shimada .................. | G06T 7/74 |

* cited by examiner

*Primary Examiner* — Vu Nguyen
(74) *Attorney, Agent, or Firm* — Jaffery Watson Mendonsa & Hamilton LLP

(57) ABSTRACT

An apparatus to facilitate three dimensional (3D) position estimation is disclosed. The apparatus includes one or more processors to receive a plurality of images captured by a camera array during a live event, locate key-points of human joints of a plurality of event participants included in the images, associate key-points of each participant across the images and recover a 3D body position of each of the plurality of participants based on the associated key-points.

16 Claims, 15 Drawing Sheets

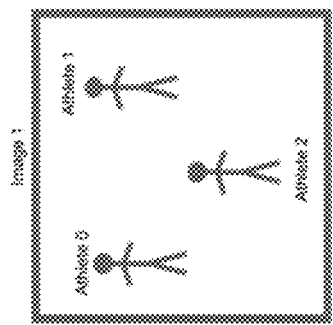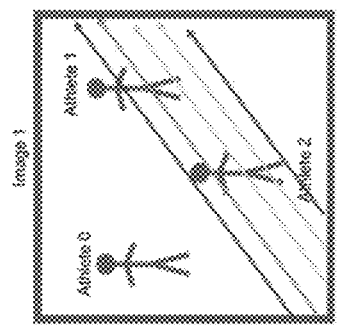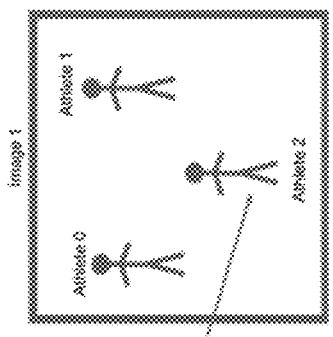
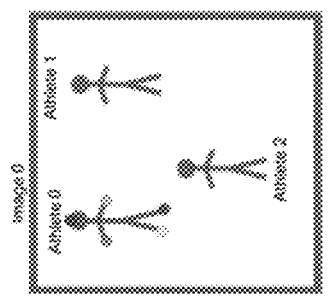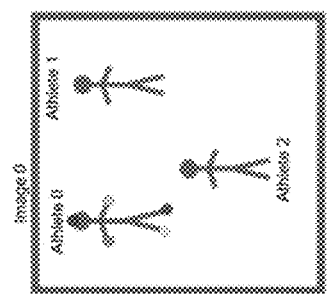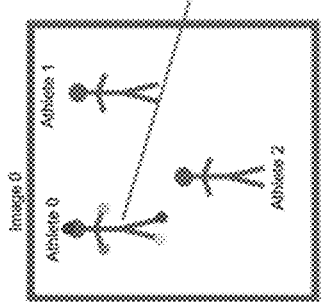
FIG. 7A
FIG. 7B
FIG. 7C

THREE DIMENSIONAL POSITION ESTIMATION MECHANISM

FIELD OF INVENTION

Embodiments described herein relate generally to data processing and more particularly to methods for performing three dimensional (3D) position estimation of athletes' body positions during sporting events.

BACKGROUND OF THE DESCRIPTION

Motion capture is the process of recording the movement of objects or people, and may be used in filmmaking and video game development to record the actions of human actors and animate digital character models in two dimensional (2D) or 3D computer animation using the recorded actions. Motion capture is performed using scripted sessions that record the movements of one or more actors, which is sampled many times per second. However the motion capture process cannot be implemented to capture live real time (e.g., sporting events) from long distances.

Currently there are systems available that estimate human location using camera arrays in sports arenas from long distances. Yet these systems are generally two-dimensional (2D) (e.g., they simply provide (x, y) coordinates of a player location relative to the ground), and do not capture athlete body position. Therefore, such systems do not provide information regarding the location of the parts of an athlete's body. There are also systems for capturing the position and orientation of body parts without markers. However, the systems may be implemented on only a single subject, and require cameras to be close to the subject. Thus, these systems are also not suitable for capturing an athletes motion during live sporting events.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-7C illustrate embodiments of stages of a geometric pairwise correspondence process.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In embodiments, a 3D position estimation mechanism receives a plurality of 2D images captured by a camera array during a live event, locates key-points of human joints of a plurality of athletes included in the images, associates key-points of each athlete across the images, recovers a 3D body position of each of the plurality of athletes based on the associated key-points and generates an animated model of a motion for one or more of the plurality of athletes.

Figure 1:
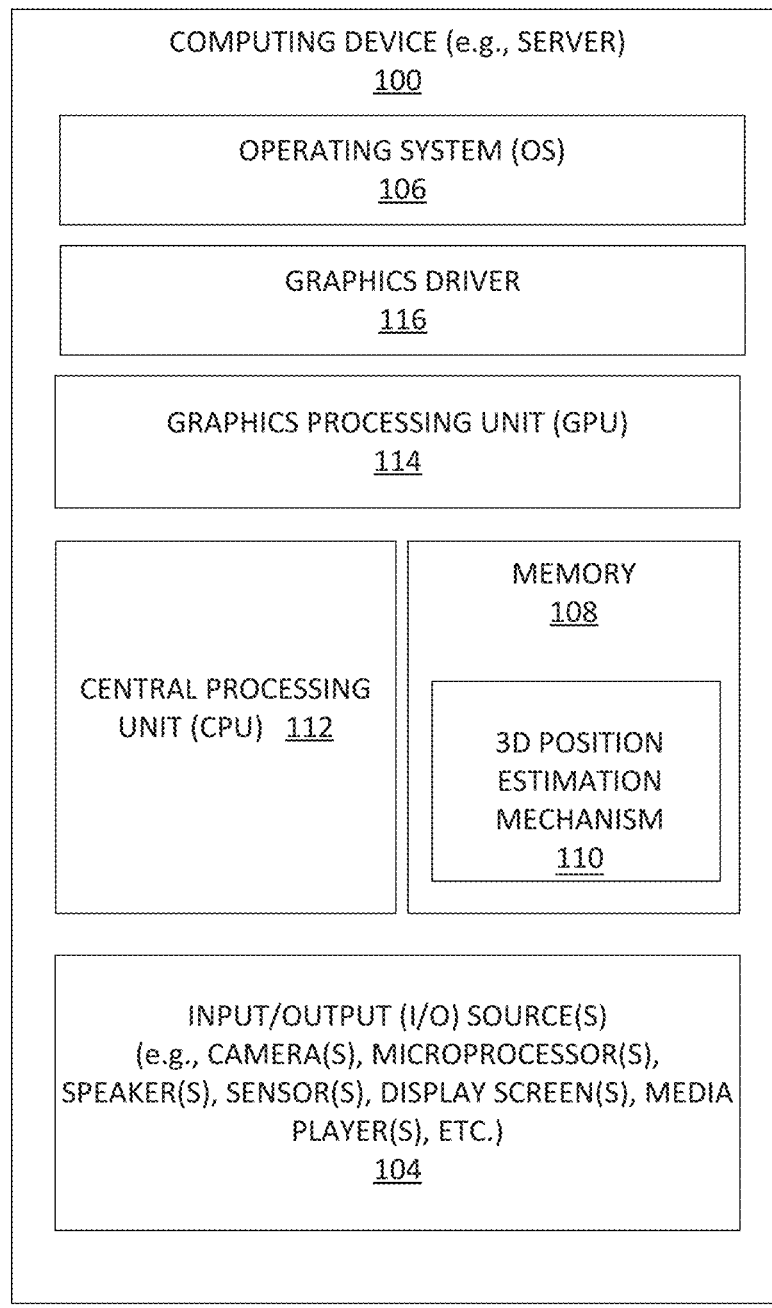
FIG. 1 illustrates one embodiment of a computer system implementing a 3D position estimation mechanism.

FIG. 1 illustrates a 3D position estimation mechanism 110 according to one embodiment. For example, in one embodiment, 3D position estimation mechanism 110 of FIG. 1 may be employed or hosted by computing device 100. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, cameras, touch panels, touch pads, virtual or regular keyboards, virtual or regular mice, ports, connectors, etc. According to one embodiment, I/O sources 104 includes a multi-camera system (or camera array) that captures live images. Computing device 100 may include operating system (OS) serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, 3D position estimation mechanism 110 may be hosted or facilitated by memory 108 of computing device 100. In another embodiment, 3D position estimation mechanism 110 may be hosted by or be part of operating system 106 of computing device 100. In yet another embodiment, 3D position estimation mechanism 110 may be hosted or facilitated by graphics driver 116. In still another embodiment, 3D position estimation mechanism 110 may be hosted by or part of graphics processing unit 114 ("GPU" or simply graphics processor") or firmware of graphics processor 114. For example, 3D estimation mechanism 110 may be embedded in or implemented as part of the processing hardware of graphics processor 114. Similarly, in yet a further embodiment, 3D position estimation mechanism 110 may be hosted by or part of central processing unit 112 ("CPU" or simply "application processor"). For example, 3D position estimation mechanism 110 may be embedded in or implemented as part of the processing hardware of central processing unit 112.

In yet another embodiment, 3D position estimation mechanism 110 may be hosted by or part of any number and type of components of computing device 100, such as a portion of 3D estimation mechanism 110 may be hosted by or part of operating system 106, another portion may be hosted by or part of graphics processor 114, another portion may be hosted by or part of central processing unit 112, while one or more portions of 3D position estimation mechanism 110 may be hosted by or part of operating system 106 and/or any number and type of devices of computing device 100. It is contemplated that embodiments are not limited to certain implementation or hosting of 3D position estimation mechanism 110 and that one or more portions or components of 3D position estimation mechanism 110 may be employed or implemented as hardware, software, or any combination thereof, such as firmware.

Computing device 100 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

According to one embodiment, 3D position estimation mechanism 110 receives images, captured via a multi-camera system, including a plurality of athletic participants (or athletes) during a live event (e.g., sporting event), and recovers 3D body position (e.g., location and orientation of major body parts, such as torso, upper arm, forearms, etc.) of each of the plurality of athletic participants. In a further embodiment, 3D position estimation mechanism 110 reconstructs the 3D body position of each of the athletic participants and generates an animated model including animated motion for one or more of the plurality of the athletic participants. In yet a further embodiment, the images are captured from a far distance from the activity occurring during the live event.

Figure 2:
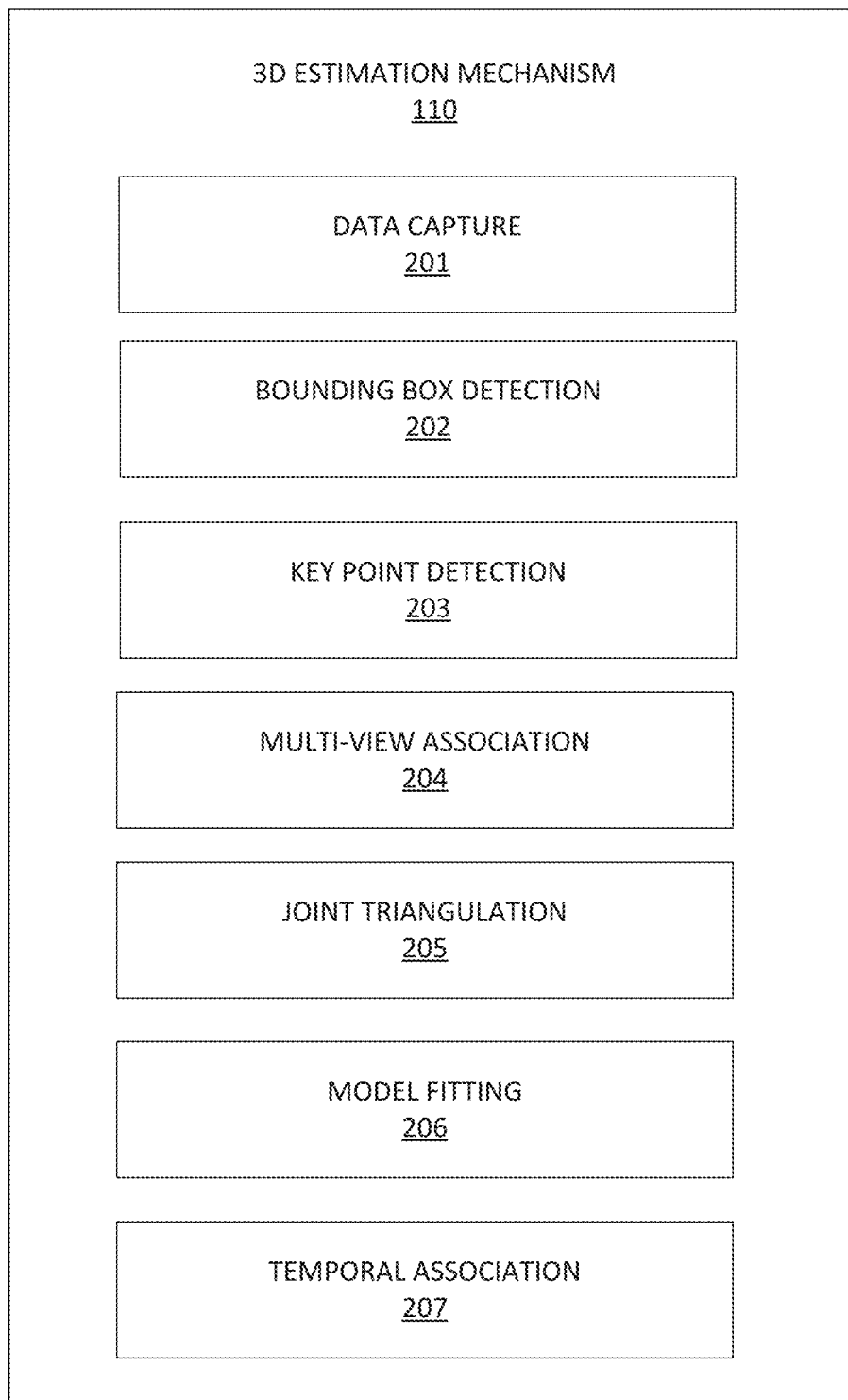
FIG. 2 illustrates one embodiment of a 3D position estimation mechanism.

FIG. 2 illustrates one embodiment of a 3D position estimation mechanism 110, including data capture module 201, bounding box detection logic 202, key point detection engine 203, multi-view association module 204, joint triangulation logic 205, model fitting logic 206 and temporal association logic 207. According to one embodiment, data capture module 201 receives images captured from an array of cameras included as one of various I/O sources 104. Additionally, data capture module 201 receives a set of camera projection matrices from the cameras that captured the images.

In one embodiment, a set of images is captured from an inward facing array of cameras, such as True View developed by Intel® Corporation of Santa Clara, Calif. In a further embodiment, the array of cameras may include between twenty to forty cameras at a distance of between one hundred to two hundred meters from the region of interest (e.g., athletic event playing area). However other embodiments may feature different array configurations.

Bounding box detection logic 202 performs human bounding box detection to detect a presence of a human athlete in a region of interest of each received image and to generate a bounding box with the athlete centered within. Key point detection engine 203 detects (or locates) key-points at major joints of an athlete in each bounding box. In some embodiments, bounding box detection logic 202 and key point detection engine 203 may be combined such that key points are simultaneously detected while generating the bounding box for each athlete in an image.

Multi-view association module 204 associates sets of key-points in different images associated with a player. Joint triangulation logic 205 triangulates a position of each joint in 3D space for a player. In one embodiment, joint triangulation logic 205 uses the camera projection matrices and the knowledge of pixel-location of the joints across different images to perform the triangulation.

Model fitting logic 206 performs kinematic fitting to pose a kinematic model with constraints around rotational degrees of freedom and body symmetry to each set of 3D joint locations. Temporal association logic 207 associates the posed kinematic models across multiple frames, if available, yielding a time series that describes the motion of the athlete over time.

Figure 3:
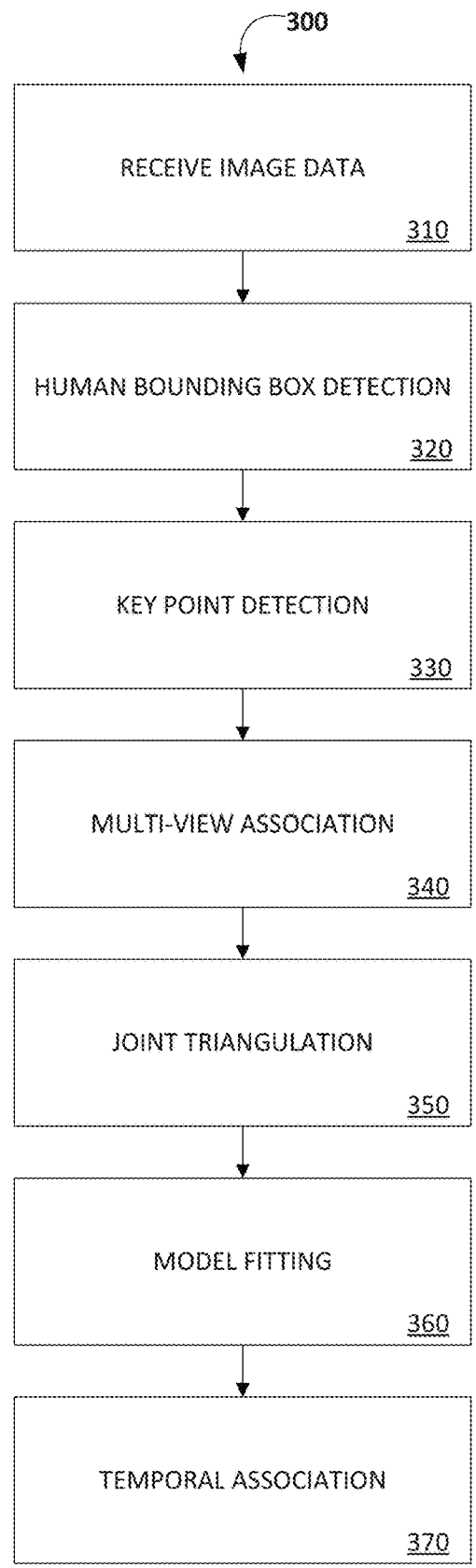
FIG. 3 is a flow diagram illustrating one embodiment of a process for performing 3D position estimation of one or more athletes' body position.

FIG. 3 is a flow diagram illustrating one embodiment of a method 300 for performing a 3D estimation of an athletes body position. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1&2 may not be repeated or discussed hereafter.

Figure 4A:
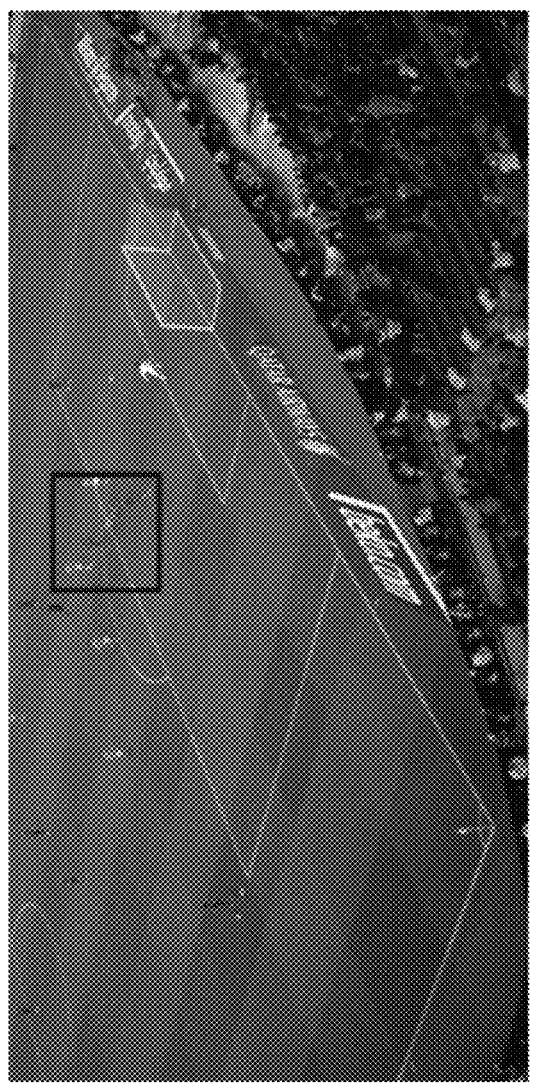
FIGS. 4A-4G illustrate embodiments of an image processed during 3D position estimation stages.

Method 300 begins at processing block 310 where image data is received. As discussed above, the image data includes images captured from an array of cameras, as well as the set of camera projection matrices from the cameras that captured the images. FIG. 4A illustrates one embodiment of a captured image.

Figure 4B:
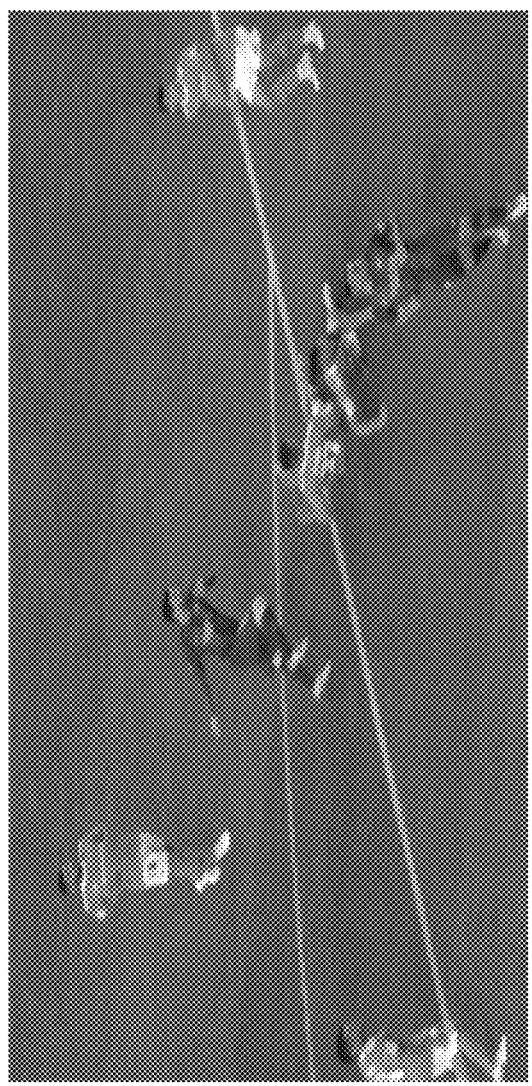

At processing block 320, human bounding box detection is performed by defining a region of interest within the captured images and detecting all human athletes in the region of interest. In one embodiment, the region of interest includes a large part of the image (or the entire image), which helps in reducing the amount of processing. Using an athletic event example, a region of interest is selected that is a slight expansion of the image of a playing field, so as to avoid processing every detected person in the audience. FIG. 4B illustrates one embodiment of a region of interest of the captured image. For illustrative purposes, FIG. 4B shows only a small portion of the playing field being used as the region interest. However, the entire field is used in an actual implementation.

Figure 4C:
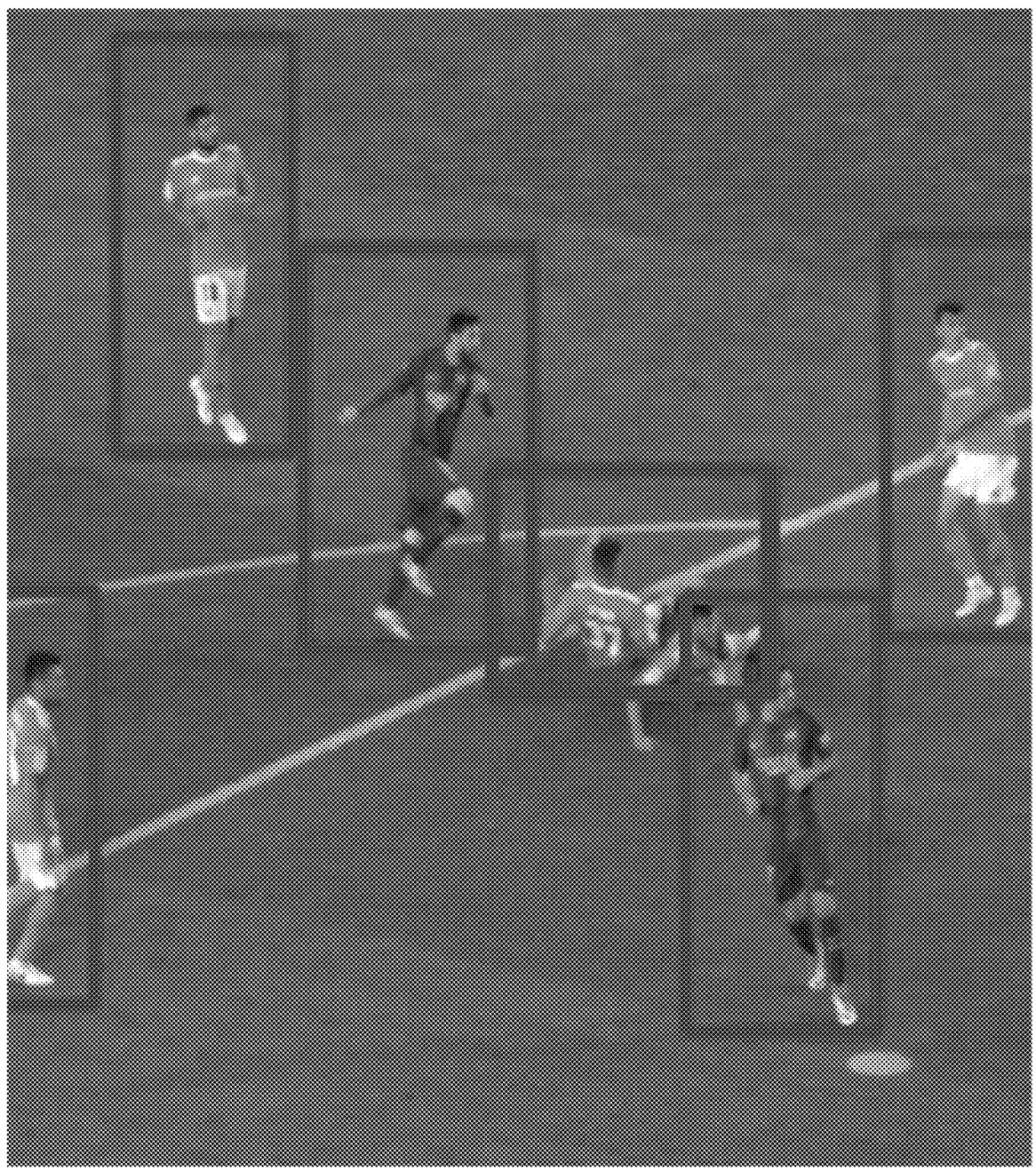

According to one embodiment, a convolution neural network (CNN) is used to achieve fast and accurate human detection. However, other embodiments may implement any type of vision technique that could reliably detect humans in the region of interest. Once detected, a bounding box is generated for each human. FIG. 4C illustrates one embodiment of bounding boxes generated for each human detected in the region of interest. Although discussed with reference to human detection, other embodiments feature an implementation of a detection of other objects (e.g., balls, pucks, bats, and sticks) for position and orientation reconstruction.

Figure 4D:
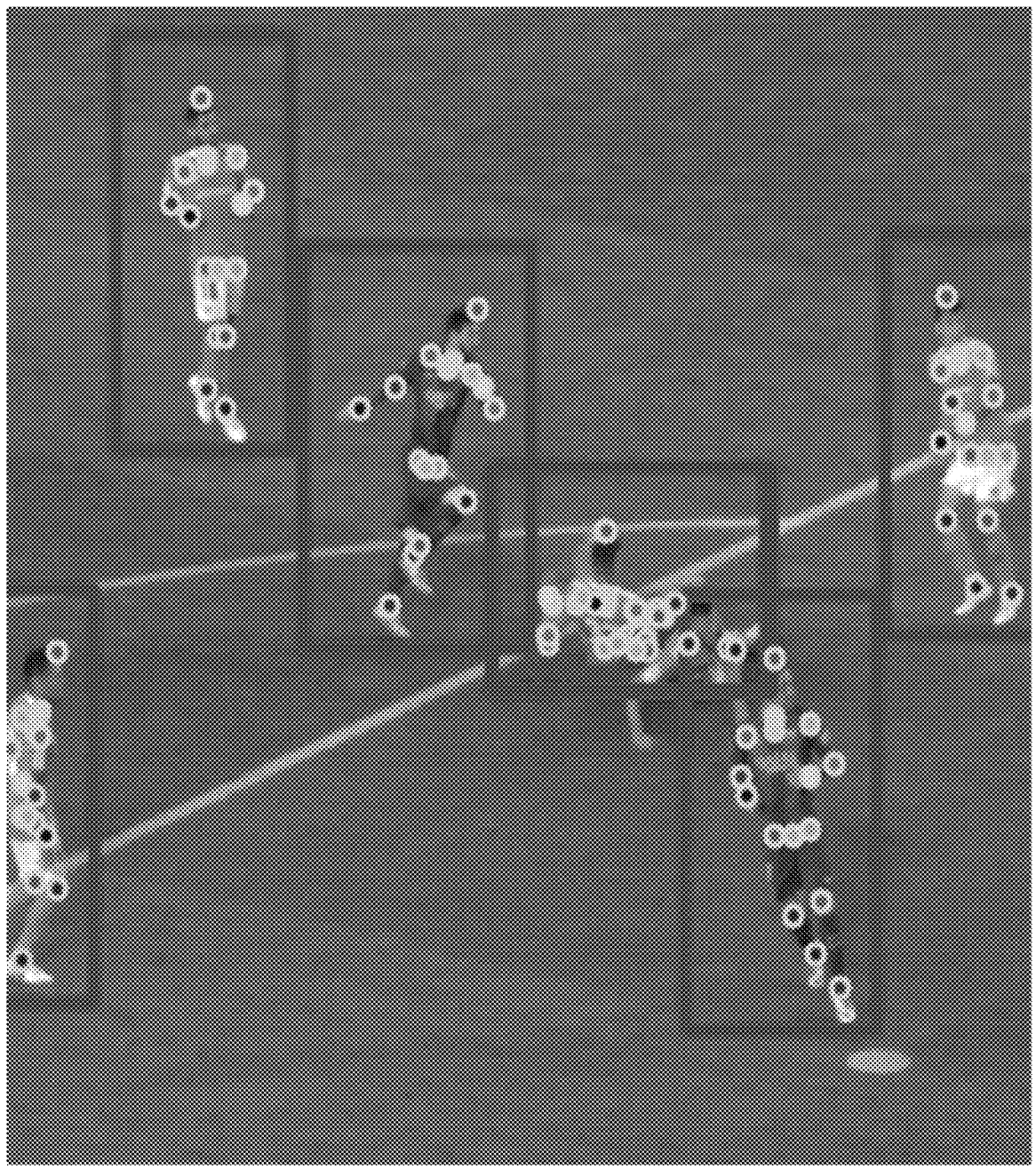

Referring back to FIG. 3, key point detection is performed, at processing block 330, for each detected bounding box by detecting and labeling key-points on each person at major joints (e.g., shoulder, hip, knee, neck, etc.). According to one embodiment, a CNN is also implemented to perform this process. However, other methods that can reliably detect key-points may be implemented. FIG. 4D illustrates one embodiment of key-points detected in the region of interest. In other embodiments, key-point detection may be implemented on other objects, in addition to humans. Moreover, as discussed above, the key-point detection may be combined with human bounding box detection.

At processing block 340, multi-view association is performed to associate the key-points that belong to the same person across different images. Typically, this process is one of the key challenges of the reconstruction. For instance, conventional methodologies of multi-view registration are not well suited for this application because of unique problems presented by sports (e.g., the subjects are very far away and are low resolution, all wearing similar clothing, and are often very close to each other, and incorrect correspondences can lead to disastrous results).

Figure 4E:
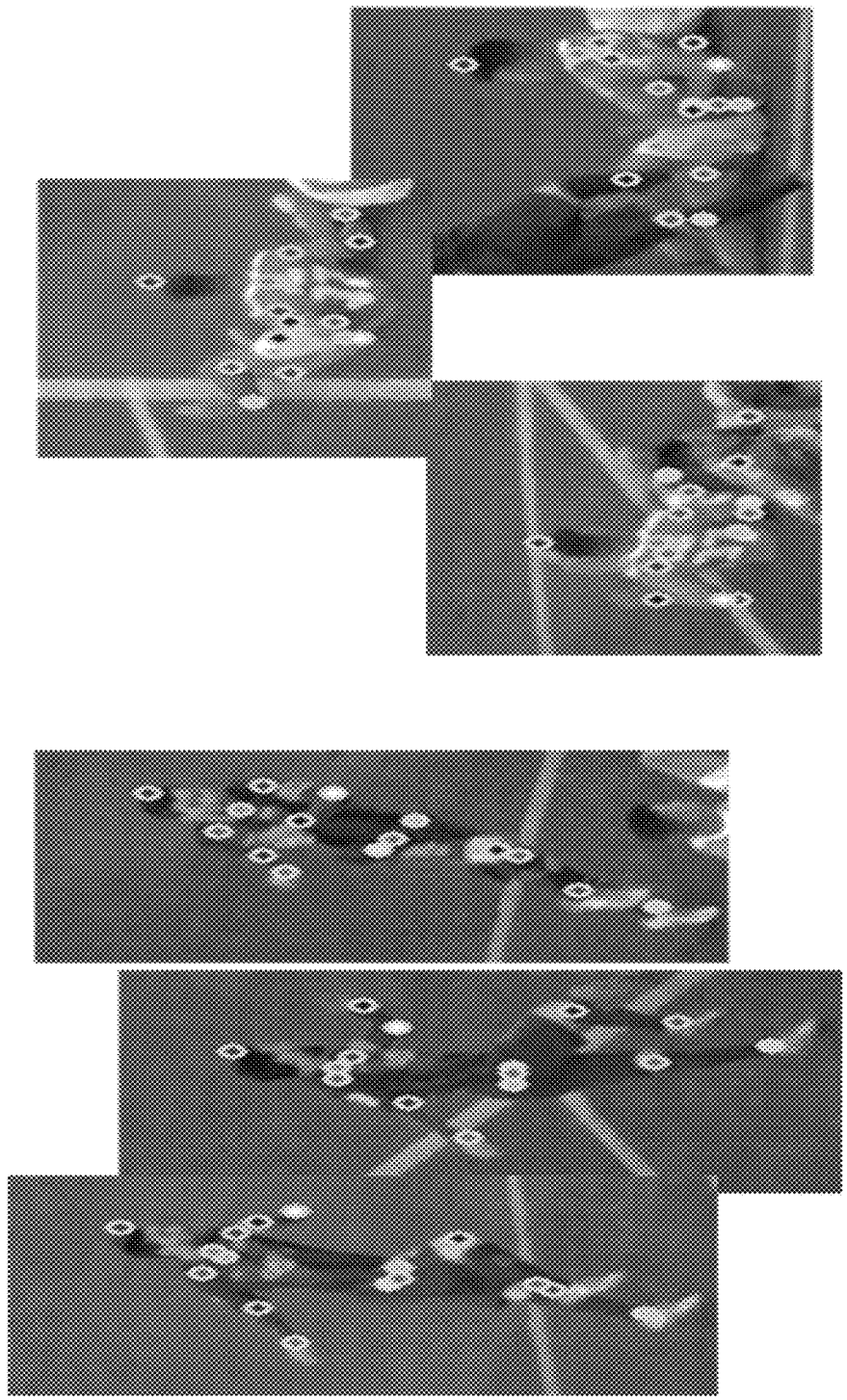
Figure 4F:
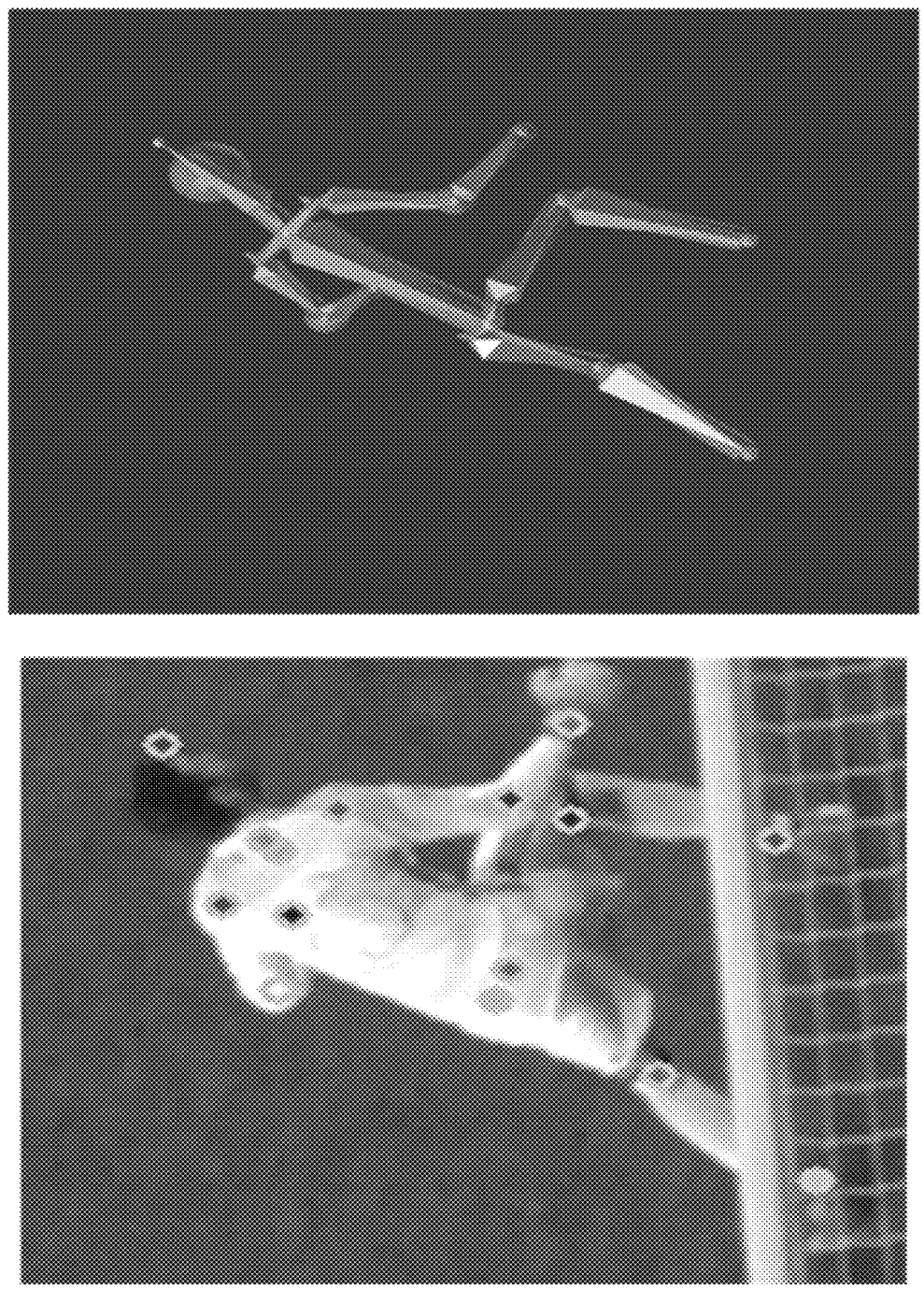
Figure 4G:
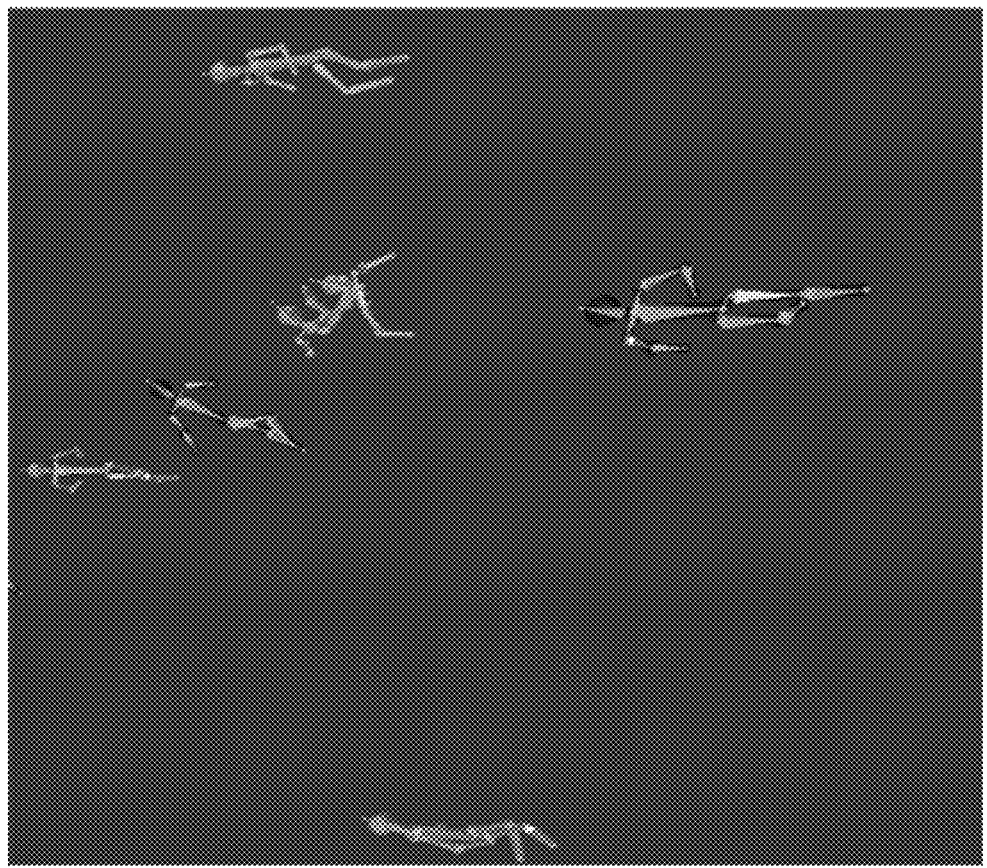
Figure 4G:
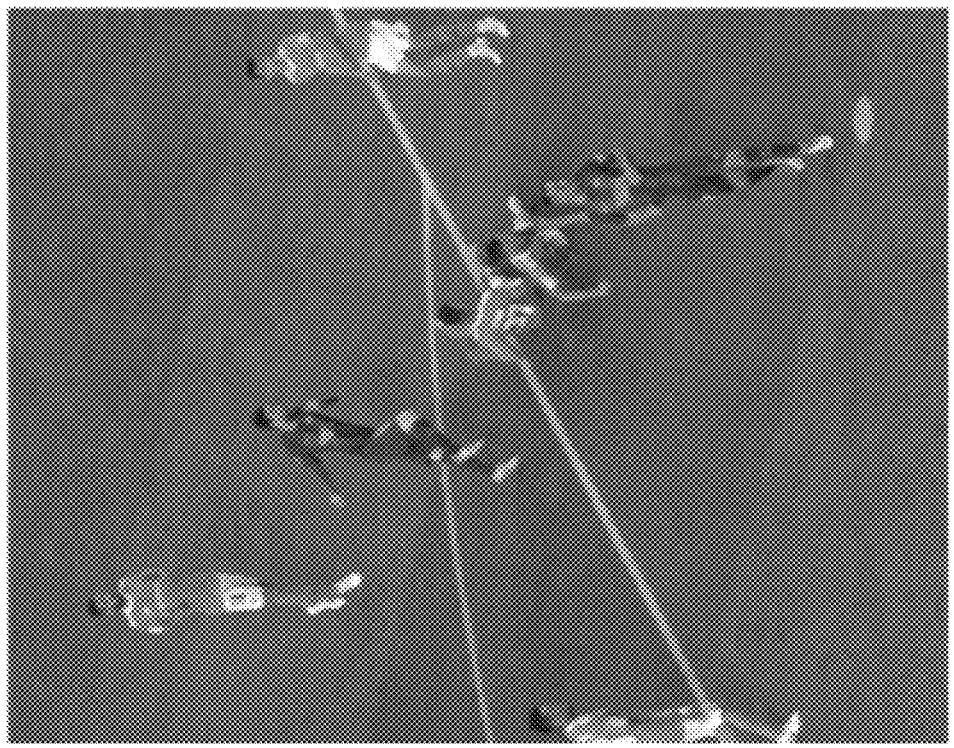
Figure 5:
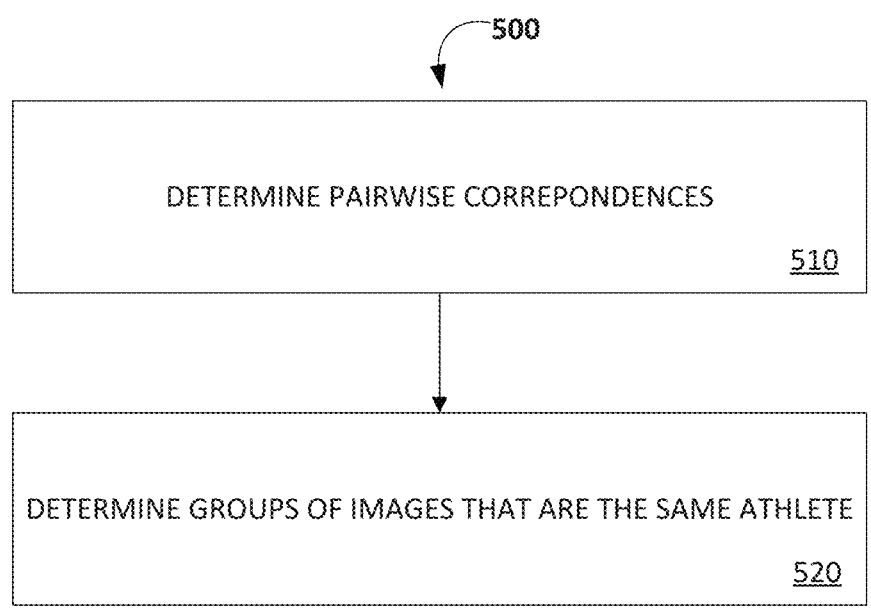
FIG. 5 is a flow diagram illustrating one embodiment of a process for performing multi-view association.

According to one embodiment, a novel geometric technique is used to reliably associate key-points in different images. FIG. 5 is a flow diagram illustrating one embodiment of a method 500 for performing a multi-view association process. Method 500 may be performed by processing logic that may comprise hardware (e.g., circuitry, dedicated logic, programmable logic, etc.), software (such as instructions run on a processing device), or a combination thereof. The processes of method 500 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter.

Method 500 begins at processing block 510 where pairwise correspondences between athletes in different images is determined (e.g., via geometric techniques). There are many different generic techniques for determining correspondences between different images. However, these conventional approaches do not work well in 3D motion estimation because of the low resolution of images, the color and shape similarities between distinct players, and the large baselines between different cameras.

Figure 6:
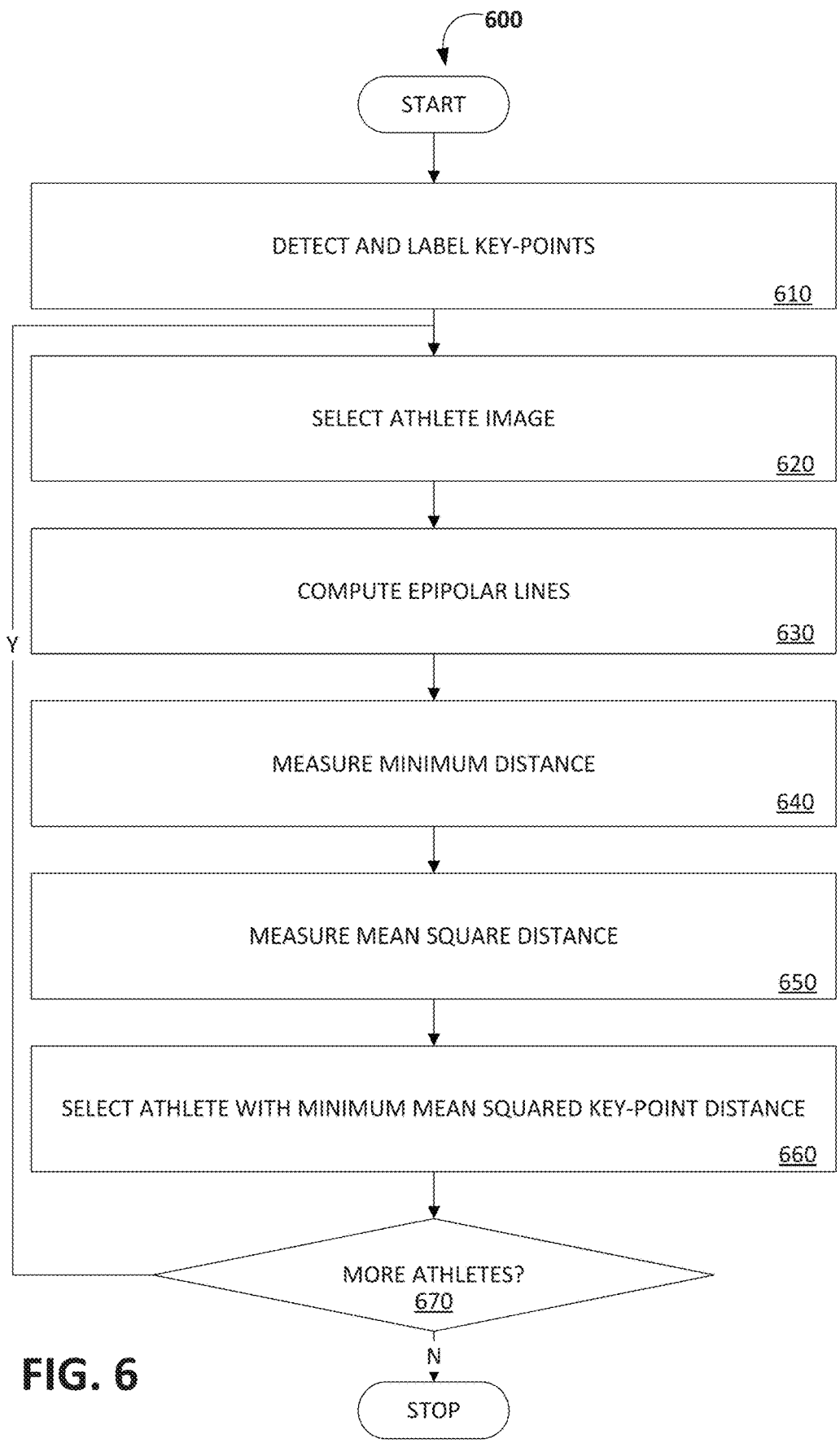
FIG. 6 is a flow diagram illustrating one embodiment of a process for performing geometric pairwise correspondence.

According to one embodiment, geometric pairwise correspondence is performed using deep CNN and geometric information from known camera matrices to determine correspondences. FIG. 6 is a flow diagram illustrating one embodiment of a method 600 for performing a geometric pairwise correspondence process. Method 600 may be performed by processing logic that may comprise hardware (e.g., circuitry, dedicated logic, programmable logic, etc.), software (such as instructions run on a processing device), or a combination thereof. The processes of method 500 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-5 may not be repeated or discussed hereafter.

Method 600 begins at processing block 610 where the CNN is used to detect and label specific key-points on each image of each athlete (e.g., "left elbow", "right ankle", etc.). FIG. 7A illustrates one embodiment of the correspondence process after the key-points have been detected. At processing block 620, an athlete image is selected. At processing block 630, epipolar lines are computed for each key-point detected in the athlete image on all other images. At processing block 640, a minimum distance is measured, for each detected athlete in the other images, between the epipolar line for a given key-point and the location of that key-point in the image. At processing block 650, the mean squared distance over all key-points in each image is computed. FIG. 7B illustrates one embodiment of the correspondence process after the epipolar lines corresponding to each key-point have been computed for each corresponding image, and the distance between the key-points in the corresponding image and the epipolar lines have been calculated.

At processing block 660, the athlete with the minimum mean squared key-point distance, for each other image, is selected. This is considered an image correspondence, subject to a threshold. According to one embodiment, there are no matches for an image upon a determination that no athlete has squared key-point distance below a certain threshold. At decision block 670, a determination is made as to whether there are additional athletes to process. If so, control is returned to processing block 620 where another athlete is selected. Otherwise the process has completed. FIG. 7C illustrates one embodiment of the correspondence process after the athlete that is closest to the epipolar lines in the corresponding image has been matched to the athlete in the original image, provided the distance is below some threshold.

Referring back to FIG. 5, the pairwise correspondences are used to determine groups of images that are of the same athlete from different camera angles, processing block 520. According to one embodiment, this determination is performed using a clustering technique that groups images of the same athletes to form an equivalence class, with the geometric correspondence as the relation. In such an embodiment, the transitivity property is utilized, such that if (~) denotes an equivalence relation, then: if x~y, and y~z=>x~z. Thus, if athlete 0 in image 1 corresponds to athlete 1 in image 2, and athlete 1 in image 2 corresponds to athlete 3 in image 3, athlete 0 in image 1 should have a correspondence to athlete 3 in image 3.

Figure 8A:
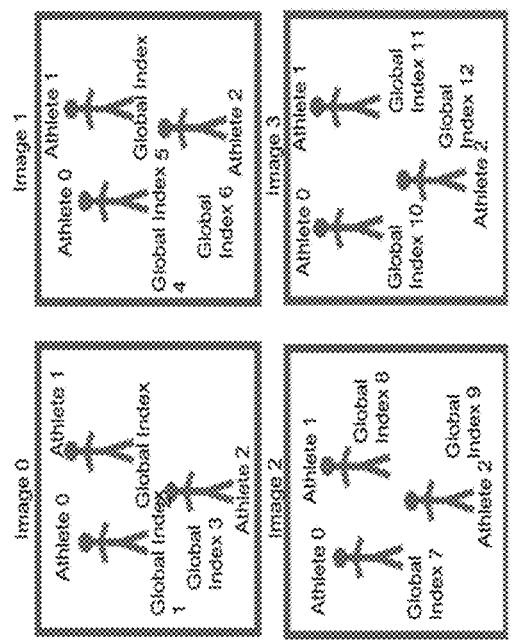
FIGS. 8A&8B illustrate embodiments of stages of a clustering process.
Figure 8B:
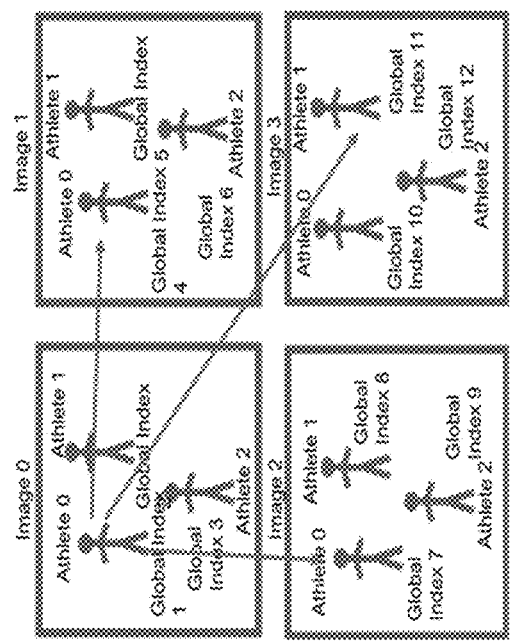

In one embodiment, this relationship is captured by enumerating all athletes across all images with an index (e.g., athlete 0 in image 0 is given index 1; athlete 1 in image 0 is given index 2; athlete 0 in image 1 is given index 3; athlete 1 in image 1 is given index 4; etc.). Subsequently, a feature vector is constructed for each index based on correspondences. FIGS. 8A&8B illustrate embodiments of stages of a clustering process. Based on FIG. 8A, the correspondences shown in FIG. 8B can be computed. Accordingly, a feature vector may be constructed corresponding to athlete with global index 1 that had 1 in the $1^{st}$ (to capture the reflexivity) $5^{th}$, $7^{th}$, and $11^{th}$ indices, and 0 everywhere else (e.g., (1, 0, 0, 0, 1, 0, 1, 0, 0, 0, 1, 0)).

In one embodiment, the feature vectors will be the same set of correspondences if two athletes from different images have the same set of correspondences. Additionally, two athletes from different images having totally distinct correspondences have feature vectors that are orthogonal to one another. According to one embodiment, this process is repeated for every image, resulting in the feature vectors being inserted into a matrix where row 1 is the feature vector (transposed) corresponding to the athlete with global index 1, and row 2 is the feature vector corresponding to the athlete with global index 2, etc.

In a further embodiment, a singular value decomposition of the resulting sparse square matrix is used to recover an orthonormal basis for the row space of the feature matrix. Because the singular value decomposition finds row vectors that maximize the explained variance, the resulting vectors will be close to normalized versions of the most prominent repeated feature vectors, and the corresponding singular value will approximate how many times this vector appears in the matrix. The singular value decomposition is implemented due to being tolerant to errors (e.g., even if some of the feature vectors have false correspondences in them, the singular value decomposition will still capture the overall structure).

Finally, a subset of feature vectors is selected by applying a threshold to the singular value. For all vectors corresponding to singular values above this threshold, a class is assigned. These classes may be considered the "prototype" equivalence class corresponding to a group of images of the same athlete. For each athlete, a cosine distance is computed between the athlete's feature vector and each "prototype" feature vector, and the athlete is assigned to the prototype class for which the cosine distance is minimized. FIG. 4E illustrates one embodiment of multi-view association performed on athletes in the region of interest.

Referring back to FIG. 3, joint triangulation is performed, processing block 350, once the key-points have been corresponded across views. According to one embodiment, the positions of each joint is triangulated using the camera matrices. In such an embodiment, joint triangulation is achieved by minimizing a photo-consistency error of the joints across all images. As a result, a position in the 3D space is found for each joint that minimizes the distance between the image of that point projected into the image plane of each camera and the detected key-point in that camera. Triangulating results in advantages, including: (1) while only two images are needed to triangulate a joint position, the information in all images that contain the joint is utilized, which mitigates errors due to calibration errors and incorrect correspondences; and (2) triangulating each joint independently of the others allows the triangulation to be performed in parallel.

At processing block 360, kinematic model fitting is performed to capture the position and orientation of each of the major segments of the body. A kinematic model is implemented by imposing constraints on the axes of rotation (e.g., the lower arm may only rotate along the local coordinate frame y axis at the elbow) to reduce the degrees of freedom in the position and orientation. As a result, the model fitting results in a kinematic body model being generated for each participant. FIGS. 4F&4G illustrate embodiments of kinematic model fitting performed on athletes in the region of interest.

At processing block 370, temporal association is performed to correspond fitted kinematic body models across different video frames. In one embodiment, kinematic models are individually fit, and a nearest-neighbors approach is used to correspond different skeletons across frames. Specifically, a fitted model is found for each fitted kinematic model that has the lowest mean distance between joints across frames, and is associated. This process is subsequently performed frame by frame, which appropriates the motion of a skeleton over the period of the capture.

The above-described mechanism may be implemented to provide human location data to video game companies for animating meshes in video games; thus enabling next generation performance monitoring and automated statistics creation, providing data for developing graphical overlays for broadcasters.

Additionally, the mechanism may be implemented for enhancing a volumetric pipeline. In such embodiments, the reconstruction of the body position information is independent of a volumetric pipeline. Thus, point clouds can be used to enhance many of the pipeline stages the body position information since it does not rely on, for example, background/foreground masking, compression, point cloud error correction.

Further, the mechanism may be implemented to perform body behavior analytics. Analytics in professional sports has been experiencing a dramatic growth. Thus, with the massive amount of fine-grained data being generated, new data-points are being generated. The reconstruction of the body position information can shed light on player and team performance.

Figure 9:
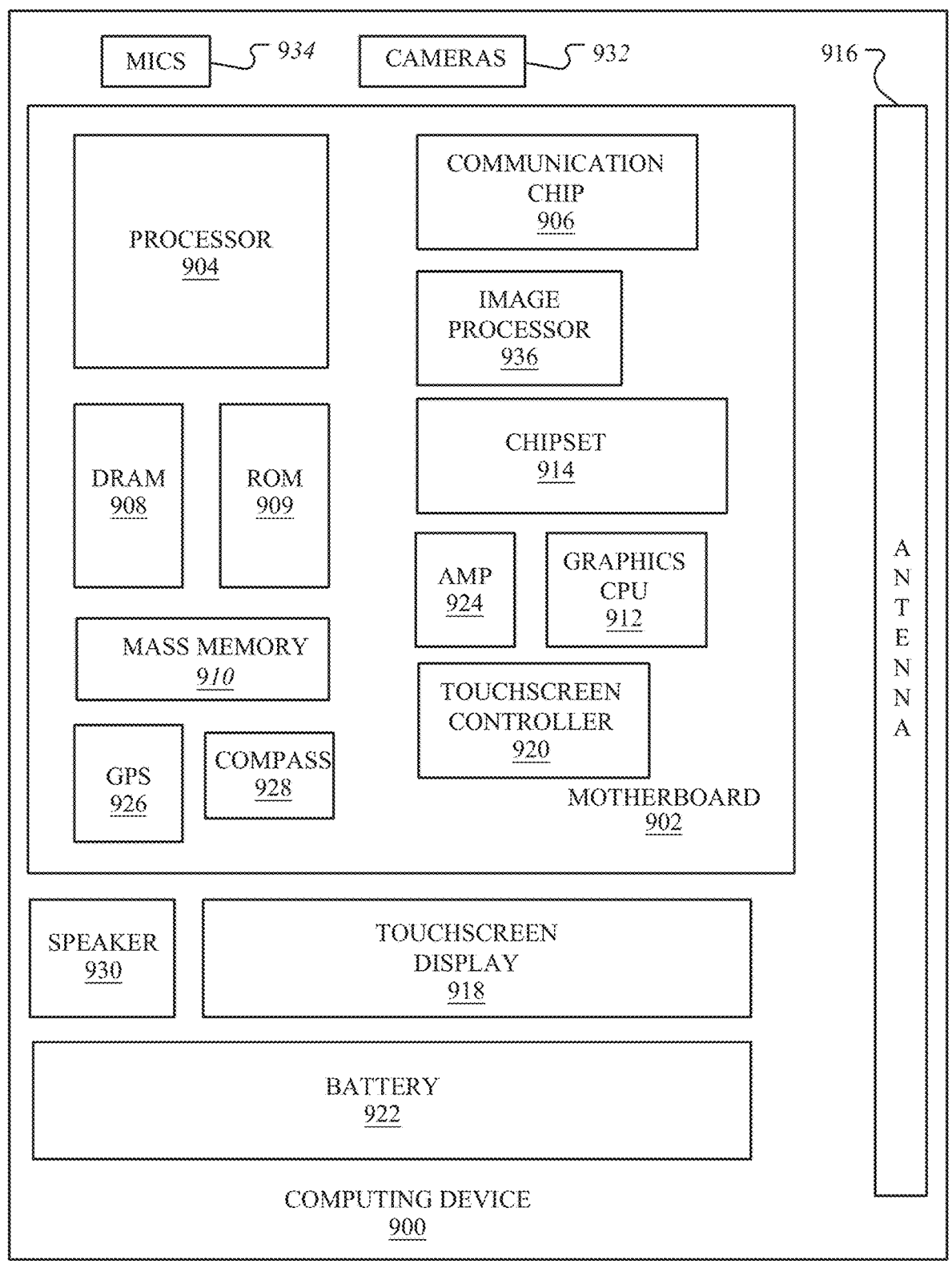
FIG. 9 illustrates a computer device capable of supporting and implementing one or more embodiments according to one embodiment.

FIG. 9 illustrates a computing device 900 in accordance with one implementation. It is contemplated that computing device 900 may be the same as or similar to computing device 100 of FIG. 1 and thus for brevity, many of the details discussed with reference to computing device 100 of FIG. 1 are not discussed or repeated hereafter. Computing device 900 houses a system (or mother) board 902. The board 902 may include a number of components, including but not limited to a processor 904 and at least one communication package 906. The communication package is coupled to one or more antennas 916. The processor 904 is physically and electrically coupled to the board 902.

Depending on its applications, computing device 900 may include other components that may or may not be physically and electrically coupled to the board 902. These other components include, but are not limited to, volatile memory (e.g., DRAM) 908, non-volatile memory (e.g., ROM) 909, flash memory (not shown), a graphics processor 912, a digital signal processor (not shown), a crypto processor (not shown), a chipset 914, an antenna 916, a display 918 such as a touchscreen display, a touchscreen controller 920, a battery 922, an audio codec (not shown), a video codec (not shown), a power amplifier 924, a global positioning system (GPS) device 926, a compass 628, an accelerometer (not shown), a gyroscope (not shown), a speaker 930, cameras 932, a microphone array 934, and a mass storage device (such as hard disk drive) 910, compact disk (CD) (not shown), digital versatile disk (DVD) (not shown), and so forth). These components may be connected to the system board 902, mounted to the system board, or combined with any of the other components.

The communication package 906 enables wireless and/or wired communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 906 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 900 may include a plurality of communication packages 906. For instance, a first communication package 906 may be dedicated to shorter range wireless communications such as Wi-Fi and Bluetooth and a second communication package 906 may be dedicated to longer range wireless communications such as GPS, EDGE, GPRS, CDMA, WiMAX, LTE, Ev-DO, and others.

The cameras 932 including any depth sensors or proximity sensor are coupled to an optional image processor 936 to perform conversions, analysis, noise reduction, comparisons, depth or distance analysis, image understanding and other processes as described herein. The processor 904 is coupled to the image processor to drive the process with interrupts, set parameters, and control operations of image processor and the cameras. Image processing may instead be performed in the processor 904, the graphics CPU 912, the cameras 932, or in any other device.

In various implementations, the computing device 900 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 900 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Figure 10:
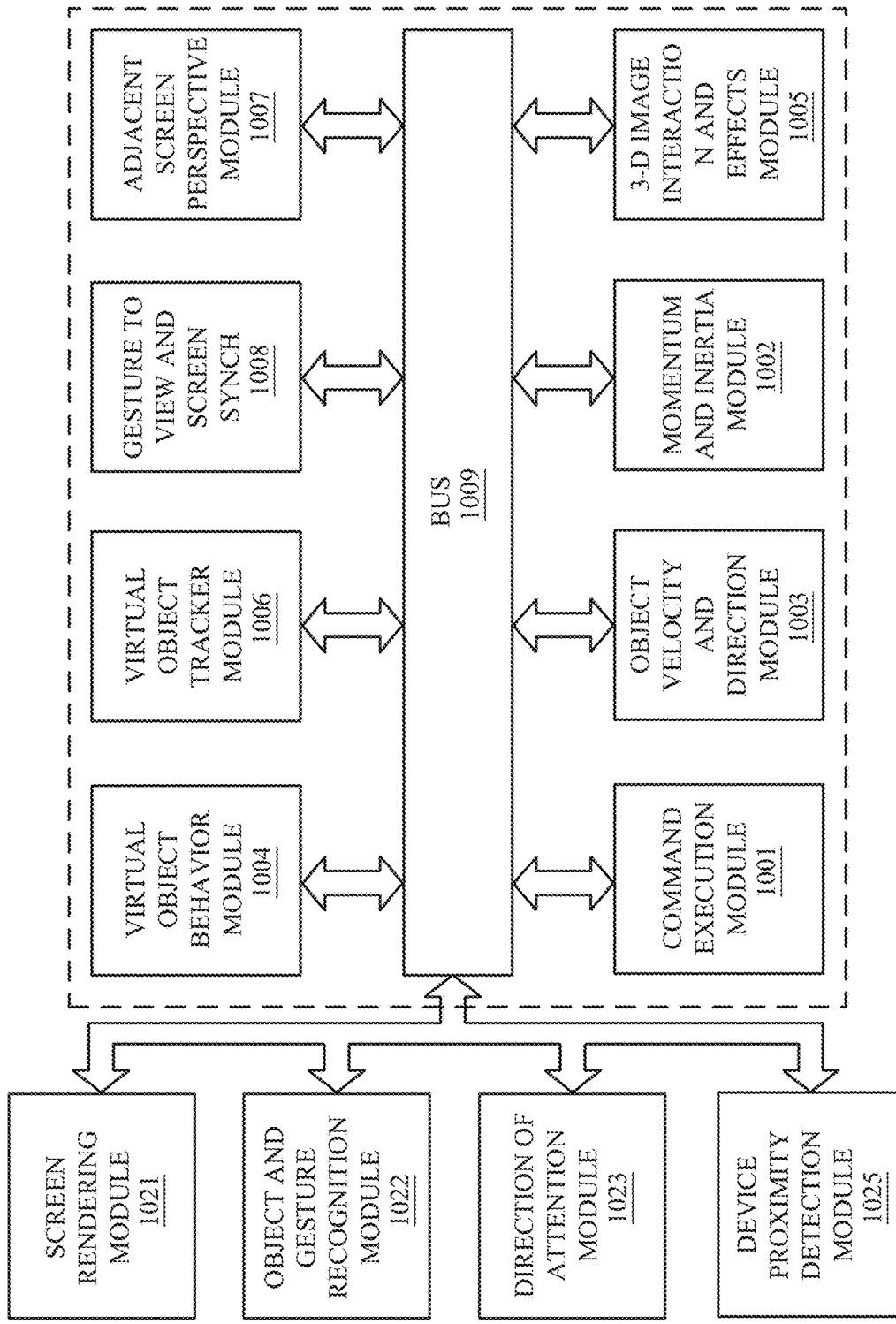
FIG. 10 illustrates an embodiment of a computing environment capable of supporting and implementing one or more embodiments according to one embodiment.

FIG. 10 illustrates an embodiment of a computing environment 1000 capable of supporting the operations discussed above. The modules and systems can be implemented in a variety of different hardware architectures and form factors including that shown in FIG. 9.

The Command Execution Module 1001 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 1021 draws objects on the one or more multiple screens for the user to see. It can be adapted to receive the data from the Virtual Object Behavior Module 1004, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 1007, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 1022 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 1023 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 1022 to ensure that the gestures or commands are associated with the appropriate library for the active display. Similarly, if the user is looking away from all of the screens, then commands can be ignored.

The Device Proximity Detection Module 1025 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 1022. For a display device, it may be considered by the Adjacent Screen Perspective Module 1007.

The Virtual Object Behavior Module 1004 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 1006 on the other hand may be adapted to track where a virtual object should be located in three-dimensional space in a vicinity of a display, and which body part of the user is holding the virtual object, based on input from the Object and Gesture Recognition Module. The Virtual Object Tracker Module 1006 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 1008, receives the selection of the view and screen or both from the Direction of Attention Module 1023 and, in some cases, voice commands to determine which view is the active view and which screen is the active screen. It then causes the relevant gesture library to be loaded for the Object and Gesture Recognition Module 1022. Various views of an application on one or more screens can be associated with alternative gesture libraries or a set of gesture templates for a given view.

The Adjacent Screen Perspective Module 1007, which may include or be coupled to the Device Proximity Detection Module 1025, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 1007 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 1003 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 1002 can use image motion, image size, and angle changes of objects in the image plane or in a three-dimensional space to estimate the velocity and direction of objects in the space or on a display. The Momentum and Inertia Module is coupled to the Object and Gesture Recognition Module 1022 to estimate the velocity of gestures performed by hands, fingers, and other body parts and then to apply those estimates to determine momentum and velocities to virtual objects that are to be affected by the gesture.

The 3D Image Interaction and Effects Module 1005 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 1001, 1002, 1003, 1004, 1005, 1006, 1007, and 1008 are connected via an interconnect or a bus, such as bus 1009.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate three dimensional (3D) position estimation, comprising one or more processors to receive a plurality 2D images captured by a camera array during a live event, locate key-points of human joints of a plurality of event participants included in the images, associate key-points of each participant across the images and recover a 3D body position of each of the plurality of participants based on the associated key-points.

Example 2 includes the subject matter of Example 1, wherein the one or more processors further generates an animated model including animated motion for one or more of the plurality of participants.

Example 3 includes the subject matter of Examples 1 and 2, wherein associating the key-points of each participant across the images comprises determining a geometric pair-wise correspondence between the images and determine one or more groups of images associated with a same participant from a plurality of camera angles.

Example 4 includes the subject matter of Examples 1-3, wherein the one or more processors further define a region of interest within the images, detects each of the plurality of participants in the region of interest, and generates a bounding box for each of the plurality of participants.

Example 5 includes the subject matter of Examples 1-4, wherein locating the key-points of human joints of a plurality of event participants comprises detecting major joints of each of the plurality of participants associated with a bounding box and labeling key-points at the major joints.

Example 6 includes the subject matter of Examples 1-5, wherein the major joints are detected via a convolution neural network (CNN).

Example 7 includes the subject matter of Examples 1-6, wherein the one or more processors further perform triangulation on the major joints at the labeled key-points.

Example 8 includes the subject matter of Examples 1-7, wherein the one or more processors further perform kinematic model fitting to capture a position and orientation of one or more major segments of each of the plurality of participants to generate a model corresponding to each of the plurality of participants.

Example 9 includes the subject matter of Examples 1-8, wherein the one or more processors further perform temporal association to fit a model of each of the plurality of participants across a plurality of video frames.

Some embodiments pertain to Example 10 that includes a method to facilitate three dimensional (3D) position estimation, comprising receiving a plurality of 2D images captured by a camera array during a live event, locating key-points of human joints of a plurality of event participants included in the images, associating key-points of each participant across the images and recovering a 3D body position of each of the plurality of participants based on the associated key-points.

Example 11 includes the subject matter of Example 10, further comprising generating an animated model including animated motion for one or more of the plurality of participants.

Example 12 includes the subject matter of Examples 10 and 11, wherein associating the key-points of each participant across the images comprises determining a geometric pairwise correspondence between the images and determine one or more groups of images associated with a same participant from a plurality of camera angles.

Example 13 includes the subject matter of Examples 10-12, further comprising defining a region of interest within the images, detecting each of the plurality of participants in the region of interest, and generating a bounding box for each of the plurality of participants.

Example 14 includes the subject matter of Examples 10-13, wherein locating the key-points of human joints of a plurality of event participants comprises detecting major joints of each of the plurality of participants associated with a bounding box and labeling key-points at the major joints.

Example 15 includes the subject matter of Examples 10-14, further comprising performing triangulation on the major joints at the labeled key-points, performing kinematic model fitting to capture a position and orientation of one or more major segments of each of the plurality of participants to generate a model corresponding to each of the plurality of participants and performing temporal association to fit a model of each of the plurality of participants across a plurality of video frames.

Some embodiments pertain to Example 16 that includes at least one computer readable medium having instructions stored thereon, which when executed by one or more processors, cause the processors to receive a plurality of 2D images captured by a camera array during a live event, locate key-points of human joints of a plurality of event participants included in the images, associate key-points of each participant across the images and recover a 3D body position of each of the plurality of participants based on the associated key-points.

Example 17 includes the subject matter of Example 16, wherein associating the key-points of each participant across the images comprises determining a geometric pairwise correspondence between the images and determine one or more groups of images associated with a same participant from a plurality of camera angles.

Example 18 includes the subject matter of Examples 16 and 17, having instructions stored thereon, which when executed by one or more processors, further cause the processors to define a region of interest within the images, detect each of the plurality of participants in the region of interest and generate a bounding box associated with each of the plurality of participants.

Example 19 includes the subject matter of Examples 16-18, wherein locating the key-points of human joints of a plurality of event participants comprises detecting major joints of each of the plurality of participants associated with a bounding box and labeling key-points at the major joints.

Example 20 includes the subject matter of Examples 16-19, having instructions stored thereon, which when executed by one or more processors, further cause the processors to perform triangulation on the major joints at the labeled key-points, perform kinematic model fitting to capture a position and orientation of one or more major segments of each of the plurality of participants to generate a model corresponding to each of the plurality of participants and perform temporal association to fit a model of each of the plurality of participants across a plurality of video frames.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An apparatus to facilitate three dimensional (3D) position estimation, comprising:
   one or more processors to receive a plurality of two dimensional (2D) images captured by a camera array during a live event, locate key-points of human joints of a plurality of event participants included in the images, associate key-points of each participant across the images and recover a 3D body position of each of the plurality of participants based on the associated key-points, wherein locating the key-points of the human joints comprises detecting major joints of each of the plurality of participants associated with a bounding box and labeling the key-points at the major joints, and
   wherein the one or more processors are further to perform triangulation of a position of each of the major joints in a 3D space for a participant having the human joints, wherein the triangulation is performed based on camera projection matrices and pixel-locations of the major joints across the images.

2. The apparatus of claim 1, wherein the one or more processors further generates an animated model including animated motion for one or more of the plurality of participants.

3. The apparatus of claim 1, wherein associating the key-points of each participant across the images comprises determining a geometric pairwise correspondence between the images and determine one or more groups of images associated with a same participant from a plurality of camera angles.

4. The apparatus of claim 3, wherein the one or more processors further defines a region of interest within the images, detects each of the plurality of participants in the region of interest, and generates a bounding box associated with each of the plurality of participants.

5. The apparatus of claim 1, wherein the major joints are detected via a convolution neural network (CNN).

6. The apparatus of claim 1, wherein the one or more processors further perform kinematic model fitting to capture a position and orientation of one or more major segments of each of the plurality of participants to generate a model corresponding to each of the plurality of participants.

7. The apparatus of claim 6, wherein the one or more processors further perform temporal association to fit a model of each of the plurality of participants across a plurality of video frames.

8. A method to facilitate three dimensional (3D) position estimation, comprising:
receiving a plurality of two dimensional (2D) images captured by a camera array during a live event;
locating key-points of human joints of a plurality of event participants included in the images, wherein locating the key-points of the human joints comprises detecting major joints of each of the plurality of participants associated with a bounding box and labeling the key-points at the major joints;
associating key-points of each participant across the images;
recovering a 3D body position of each of the plurality of participants based on the associated key-points; and
performing triangulation of a position of each of the major joints in a 3D space for a participant associated with the human joints, wherein the triangulation is performed based on camera projection matrices and pixel-locations of the major joints across the images.

9. The method of claim 8, further comprising generating an animated model including animated motion for one or more of the plurality of participants.

10. The method of claim 9, wherein associating the key-points of each participant across the images comprises:
determining a geometric pairwise correspondence between the images; and
determining one or more groups of images associated with a same participant from a plurality of camera angles.

11. The method of claim 10, further comprising:
defining a region of interest within the images;
detecting each of the plurality of participants in the region of interest; and
generating a bounding box associated with each of the plurality of participants.

12. The method of claim 8, further comprising:
performing kinematic model fitting to capture a position and orientation of one or more major segments of each of the plurality of participants to generate a model corresponding to each of the plurality of participants; and
performing temporal association to fit a model of each of the plurality of participants across a plurality of video frames.

13. At least one non-transitory computer readable medium having instructions stored thereon, which when executed by one or more processors, cause the processors to:
receive a plurality of two dimensional (2D) images captured by a camera array during a live event;
locate key-points of human joints of a plurality of event participants included in the images, wherein locating the key-points of the human joints comprises detecting major joints of each of the plurality of participants associated with a bounding box and labeling the key-points at the major joints;
associate key-points of each participant across the images;
recover a three-dimensional (3D) body position of each of the plurality of participants based on the associated key-points; and
performing triangulation of a position of each of the major joints in a 3D space for a participant associated with the human joints, wherein the triangulation is performed based on camera projection matrices and pixel-locations of the major joints across the images.

14. The non-transitory computer readable medium of claim 13, wherein associating the key-points of each participant across the images comprises:
determining a geometric pairwise correspondence between the images; and
determining one or more groups of images associated with a same participant from a plurality of camera angles.

15. The non-transitory computer readable medium of claim 14, having instructions stored thereon, which when executed by one or more processors, further cause the processors to:
define a region of interest within the images;
detect each of the plurality of participants in the region of interest; and
generate a bounding box associated with each of the plurality of participants.

16. The non-transitory computer readable medium of claim 13, having instructions stored thereon, which when executed by one or more processors, further cause the processors to:
perform kinematic model fitting to capture a position and orientation of one or more major segments of each of the plurality of participants to generate a model corresponding to each of the plurality of participants; and
perform temporal association to fit a model of each of the plurality of participants across a plurality of video frames.

* * * * *